United States Patent
Weber et al.

(10) Patent No.: US 11,277,299 B2
(45) Date of Patent: Mar. 15, 2022

(54) METHOD AND DEVICE FOR ANOMALY DETECTION IN A VEHICLE

(71) Applicant: Robert Bosch GmbH, Stuttgart (DE)

(72) Inventors: Andreas Weber, Weissach (DE); Jan Holle, Stuttgart (DE); Janin Wolfinger, Stuttgart (DE); Jens Gramm, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 16/568,706

(22) Filed: Sep. 12, 2019

(65) Prior Publication Data
US 2020/0092158 A1 Mar. 19, 2020

(30) Foreign Application Priority Data

Sep. 19, 2018 (DE) .......................... 102018215945.9

(51) Int. Cl.
  *H04L 12/24* (2006.01)
  *H04L 41/06* (2022.01)
  *H04L 67/12* (2022.01)
  *H04L 1/00* (2006.01)

(52) U.S. Cl.
  CPC .............. *H04L 41/06* (2013.01); *H04L 1/004* (2013.01); *H04L 67/12* (2013.01)

(58) Field of Classification Search
  CPC ...... H04L 41/06; H04L 67/12; H04L 12/2803
  See application file for complete search history.

(56) References Cited

U.S. PATENT DOCUMENTS

| | | | |
|---|---|---|---|
| 9,805,601 B1* | 10/2017 | Fields | G08G 1/096844 |
| 10,432,645 B2* | 10/2019 | Unagami | G06F 21/606 |
| 2011/0130905 A1* | 6/2011 | Mayer | G07C 5/008 701/22 |
| 2016/0350985 A1* | 12/2016 | McQuade | G06F 11/0739 |
| 2017/0310591 A1* | 10/2017 | Seo | H04L 67/12 |
| 2019/0220011 A1* | 7/2019 | Della Penna | G08G 1/0133 |
| 2020/0053112 A1* | 2/2020 | Torisaki | H04L 67/12 |

FOREIGN PATENT DOCUMENTS

| | | |
|---|---|---|
| DE | 102017210787 A1 | 12/2018 |
| DE | 102017213119 A1 | 1/2019 |

\* cited by examiner

*Primary Examiner* — Esther B. Henderson
(74) *Attorney, Agent, or Firm* — Norton Rose Fulbright US LLP; Gerard Messina

(57) ABSTRACT

In a method and a device for detecting anomalies in data in data traffic across a communication network in a vehicle, the device encompasses a plurality of hardware interfaces and a monolithic coupling element designed for transmitting data arriving at one of the hardware interfaces in a data packet via at least one of the hardware interfaces and analyzing the data packet or a copy of the data packet for a detection of anomalies in the data of the communication network or of a subsystem of the communication network connected to one of the hardware interfaces.

11 Claims, 2 Drawing Sheets

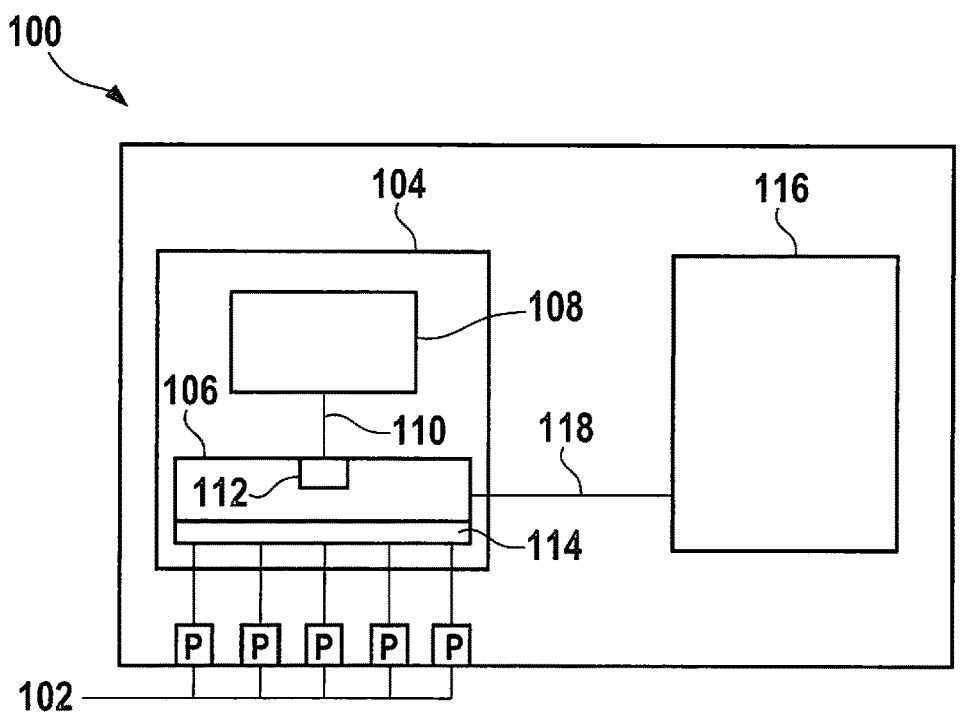
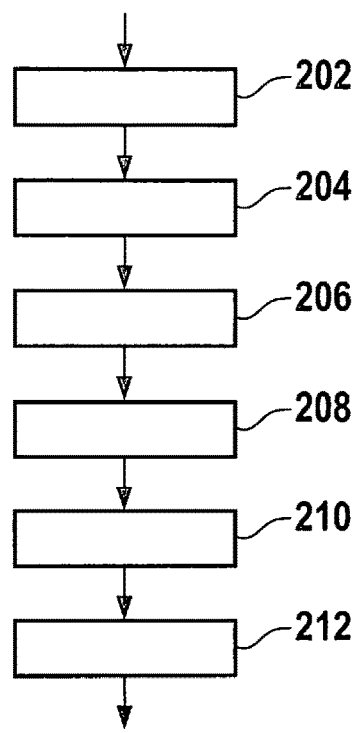
Fig. 1
Fig. 2

METHOD AND DEVICE FOR ANOMALY DETECTION IN A VEHICLE

CROSS-REFERENCE TO RELATED APPLICATIONS

The present application claims priority under 35 U.S.C. § 119 to DE 10 2018 215 945.9 filed in the Federal Republic of Germany on Sep. 19, 2018, the content of which is hereby incorporated by reference herein in its entirety.

FIELD OF THE INVENTION

The present invention relates to a method and a device for detecting an anomaly in a vehicle, in particular in an automotive Ethernet network, to a computer program, and to a machine-readable memory medium.

BACKGROUND

Methods for anomaly detection are known from unpublished DE 10 2017 210 787 and DE 10 2017 213 119. The aforementioned documents require dedicated components and a static architecture, which must be added in addition to a communication network structure to be monitored.

SUMMARY

It is desirable to provide an improved method and an improved device.

In conjunction with aspects of the following embodiments, deviations from a normal behavior, which can arise for various reasons in data of a system for the communication of the data, are referred to in the following as an anomaly. Causes therefor can be, for example, of the following type: (a) defective or completely failed sensors deliver wrong data or no data at all, (b) components of the system are damaged, or (c) the system was manipulated by an external source (for example, a hacker attack).

The detection of anomalies in data in the data traffic during internal as well as external communication is implemented using a network-based intrusion detection system (NIDS). In the following, "NIDS" refers to a system, which monitors and analyzes the entire data traffic in the communication network in order to detect all anomalies in the internal and external data exchange. A NIDS, which has been expanded with a component for preventing or responding to detected anomalies, is referred to in the following as a network-based intrusion detection and prevention system (NIDPS).

Conventional NIDS or NIDPS are implemented using dedicated hardware. Either the data traffic is transferred from a central switch to a separate NIDS or NIDPS component, or selected switches are expanded with separate NIDS or NIDPS hardware components. In the first approach, particularly fast switchports are utilized in order to transfer a preferably large amount of data traffic to the NIDS or to the NIDPS. The second approach utilizes a NIDS or NIDPS hardware component, which, in addition to the switch hardware, is situated directly on the switch.

The device for detecting anomalies in data in the data traffic across a communication network in a vehicle encompasses a plurality of hardware interfaces and a monolithic coupling element, the coupling element being designed for transmitting data arriving at one of the hardware interfaces in a data packet via at least one of the hardware interfaces, the coupling element being designed for analyzing the data packet or a copy of the data packet for a detection of anomalies in the data of the communication network or of a subsystem of the communication network connected to one of the hardware interfaces. This makes it possible to place the NIDPS or the NIDS, integrated into an automotive Ethernet switch hardware, in a control unit of the vehicle. The automotive Ethernet switch is designed, in particular, according to one of the standards IEEE 802.3bw or IEEE 802.3 bp and is therefore expanded in order to analyze the network data traffic of an entire subsystem. Moreover, the transmission of Ethernet packets at each of the Ethernet ports, i.e., at the hardware interfaces, is possible in a direct and sufficiently rapid manner due to this integrated coupling element.

Preferably, the coupling element encompasses a distribution unit, a computing unit, and an internal interface, which is independent of the hardware interfaces to the communication network and is located between the computing unit and the distribution unit, the computing unit being designed for establishing at least one hardware interface via the internal interface, across which the distribution unit transmits the data, and the distribution unit being designed for providing the data packet or a copy of the data packet to the computing unit via the internal interface for a detection of anomalies. This makes it possible to analyze a sufficient quantity of Ethernet packets and to implement an extensive NIDS or NIDPS on the microcontroller of the switch. In this aspect, the NIDPS or the NIDS analyzes the data packet or the copy of the data packet. This makes it possible to analyze the data packet itself or to process the data packet independently of the analysis of its copy.

Preferably, the distribution unit encompasses a filter element, which is designed for affecting a data traffic across the internal interface to the computing unit, in order to regulate a data volume for the detection of anomalies in the computing unit. The switch hardware prefilters the data traffic to the microcontroller and, thereby, regulates the data volume to be processed there.

Preferably, the distribution unit encompasses a message buffer designed for storing the data packet or the copy of the data packet. The message buffer can be an input message buffer or an output message buffer of the switch, or a queue of the switch, or an additional message buffer independent thereof. This makes it possible to carry out the analysis using data from the message buffer without adversely affecting the actual switch function.

Preferably, the distribution unit, the first computing unit, and the internal interface are designed as a one-chip system. Due to the architectural advantage offered by a switch system on a chip (SoC), it is possible to analyze a sufficient quantity of Ethernet packets and to implement an extensive NIDPS or NIDS on the microcontroller of the switch SoC.

Preferably, the device encompasses a host controller or a domain controller that is connected to the coupling element via an interface and that is designed for centrally administering the subsystem as a local security area of the communication network. Due to the placement of the NIDS in an automotive Ethernet switch in a control unit of the vehicle, which has the function of a gateway or a domain control unit, it is possible, due to the central position of the control unit in the network topology of the communication network, to analyze the network data traffic of the communication network or of the entire subsystem.

In an example embodiment, a communication network for a vehicle is characterized by a gateway, at least one domain control unit connected to the gateway for communication, and at least one control unit connected to the domain control unit for communication, the domain control unit or the gateway being designed for detecting anomalies in data in the data traffic in the communication network or in a subsystem of the communication network, which encompasses the domain control unit and the at least one control unit.

An example embodiment of the present invention is directed to a method for detecting anomalies in data in the data traffic across a communication network in a vehicle, the method including receipt of a data packet at one of a plurality of hardware interfaces, transmission of data arriving in the data packet using a monolithic coupling element via at least one of the hardware interfaces, and analysis of the data packet or of a copy of the data packet using the coupling element for detecting anomalies in the data of the communication network or of a subsystem of the communication network connected to one of the hardware interfaces. This makes it possible to carry out the analysis of the NIDPS or the NIDS integrated into a function of the automotive Ethernet switch in the control unit of the vehicle.

Preferably, a computing unit of the coupling element establishes, via an internal interface, which is independent of the hardware interfaces to the communication network and is located between the computing unit and a distribution unit of the coupling element, the hardware interfaces via which the distribution unit transmits the data, the data packet or a copy of the data packet being provided by the distribution unit to the computing unit via the internal interface for a detection of anomalies. In this aspect, the NIDPS or the NIDS analyzes the data packet or the copy of the data packet. This makes it possible to analyze the data packet itself or to process the data packet independently of the analysis of the copy.

Preferably, a filter element affects a data traffic via the internal interface to the computing unit, in order to regulate a data volume for the detection of anomalies in the computing unit. This prefiltering regulates the data volume to be processed.

Preferably, the data packet or the copy of the data packet is stored in a message buffer of the distribution unit. This enables the analysis based on the content of the message buffer.

Preferably, a host controller or a domain controller communicates via an interface with the coupling element, in order to centrally administer the subsystem as a local security area of the communication network. The function of the NIDPS or the NIDS runs in an automotive Ethernet switch in a control unit of the vehicle, which has the function of a gateway or a domain control unit. Due to the central position of the control unit in the network topology of the communication network, it is possible to analyze the network data traffic of the entire subsystem.

A computer program, which is configured for carrying out the method, and a machine-readable memory medium, on which the computer program runs, are also provided.

Further example embodiments result from the following description and the drawings.

BRIEF DESCRIPTION OF THE DRAWING

FIG. 1 schematically shows parts of an automotive Ethernet control unit according to an example embodiment of the present invention.

FIG. 2 is a flowchart that illustrates a method for detecting anomalies in a data traffic using the automotive Ethernet control unit according to an example embodiment of the present invention.

DETAILED DESCRIPTION

Figure 3:
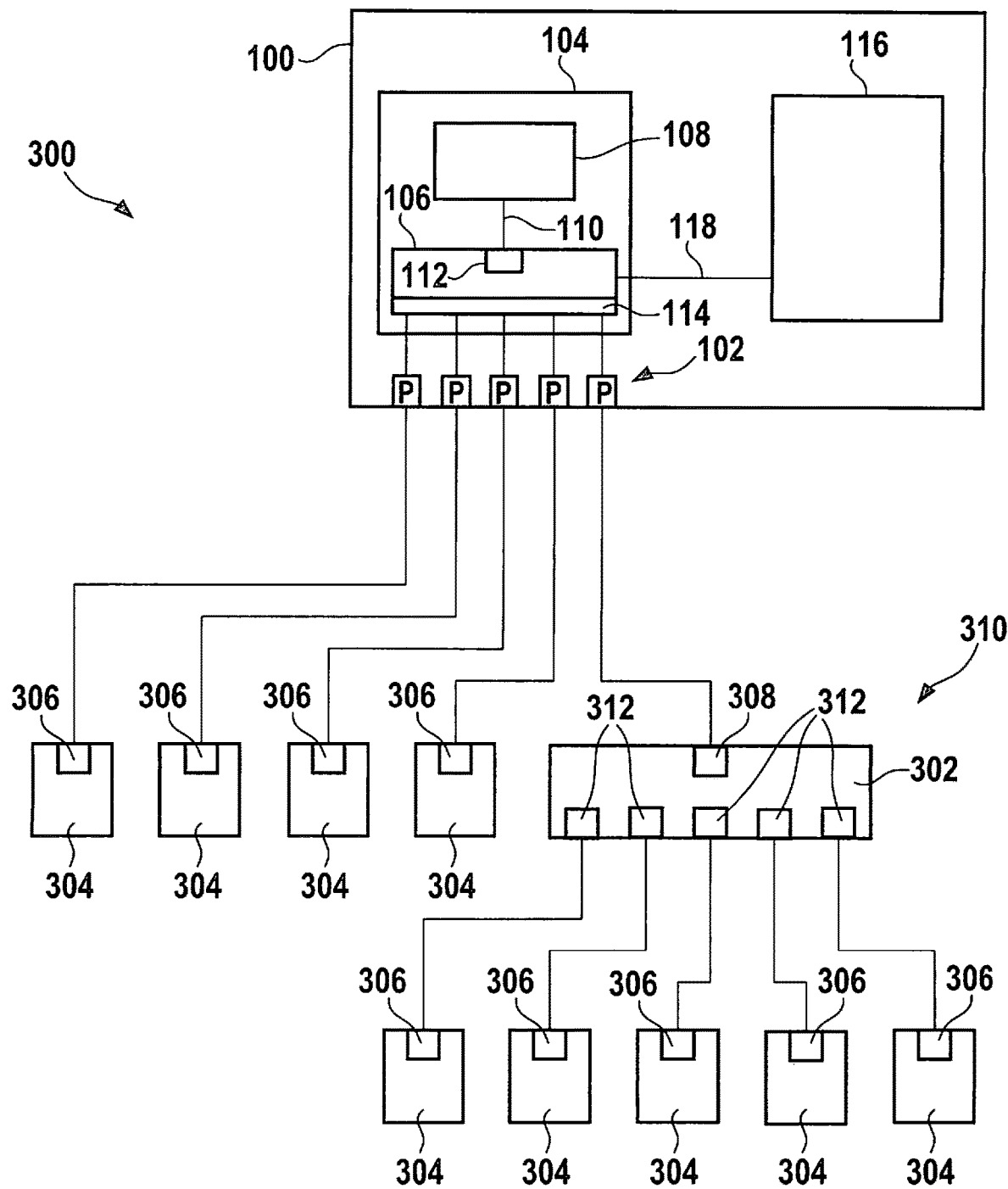
FIG. 3 schematically shows parts of an automotive Ethernet communication network according to an example embodiment of the present invention.

FIG. 1 schematically shows parts of an automotive Ethernet control unit as a device 100 for detecting anomalies in data in the data traffic across a communication network in a vehicle. An automotive Ethernet refers to a mode of operation and a hardware configuration according to one of the automotive hardware standards, in particular according to IEEE802.3, for example, according to IEEE802.3bw or IEEE8023 bp.

Device 100 encompasses a plurality of hardware interfaces 102. Hardware interfaces 102 in the example are automotive Ethernet ports of the automotive Ethernet control unit.

Device 100 encompasses a monolithic coupling element 104, which is designed for transmitting data arriving at one of hardware interfaces 102 in a data packet via at least one of hardware interfaces 102. Coupling element 104 can transmit the data packet again at the same hardware interface at which it was received. A received data packet can be transmitted again at one or multiple hardware interfaces 102. In the example, coupling element 104 has a configuration and a function as an automotive Ethernet switch. In the example, Ethernet packets are utilized as data packets. "Monolithic" means coupling element 104 is made up, in particular inseparably, of electronic components. "Inseparably" means the components can not be nondestructively separated.

In the example, coupling element 104 encompasses a distribution unit 106 and a computing unit 108. Computing unit 108 is, for example, a microcontroller. Coupling element 104 encompasses an internal interface 110, which is independent of hardware interfaces 102 to the communication network and is located between computing unit 108 and distribution unit 106.

Distribution unit 106 encompasses at least one message buffer 114 and is designed for storing the data packet or a copy of the data packet in message buffer 114. For example, distribution unit 106 is an automotive Ethernet switch hardware. For example, the distribution unit 106 encompasses an input memory and an output memory of the switch, as message buffers. An additional message buffer 114 and/or a queue for data packets can also be provided as message buffer 114.

Computing unit 108 is designed for establishing, using internal interface 110, at least one hardware interface 102 via which distribution unit 106 transmits the data. For example, computing unit 108 carries out an arbitration using distribution unit 106, by way of which it is established which data packet from which Ethernet port from the input memory is transmitted when for which Ethernet port into the output memory.

Coupling element 104 is designed for analyzing the data packet or a copy of the data packet for a detection of anomalies in the data of the communication network or of a subsystem of the communication network connected to one of hardware interfaces 102.

Distribution unit 106 is designed for providing the data packet or a copy of the data packet to computing unit 108 via internal interface 110 for a detection of anomalies. The data packet or the copy of the data packet is provided at internal interface 110 by distribution unit 106, for example, from message buffer 114. In the example, distribution unit 106 encompasses a filter element 112 designed for affecting a data traffic across internal interface 110 to computing unit 108, in order to regulate a data volume for the detection of anomalies in computing unit 108. For example, only data packets which come from the subsystem or are to be transmitted into the subsystem are provided at internal interface 110.

In the example, device 100 encompasses a host controller 116 or a domain controller connected to coupling element 104 via an interface 118.

Host controller 116 or the domain controller is designed for centrally administering the subsystem as a local security area of the communication network.

It is particularly advantageous when distribution unit 106, first computing unit 108, and internal interface 110 are designed as a one-chip system. This is a particularly good monolithic embodiment of coupling element 104 and is described in greater detail in the following.

The architecture of a gateway is similar to that of a domain control unit and is made up of a host controller 116, a switch system on a chip 104, and Ethernet ports 102. The switch system on a chip 104 is subdivided into a switch microcontroller 108 and a switch hardware 106. Switch hardware 106 implements the switching and conveys the network data traffic to switch microcontroller 108. During the conveyance of the network data traffic to switch microcontroller 108, a prefiltering can be optionally carried out using filter element 112. Moreover, a selection can be made as to whether a copy or the actual network traffic is to be utilized for the conveyance. Switch microcontroller 108 is directly, i.e., sufficiently rapidly, connected to switch hardware 106.

The NIDS or the NIDPS is placed on switch microcontroller 108 of switch system on a chip 104. The transmission of a copy of the Ethernet packets of all Ethernet ports 102 is established due to the direct and sufficiently rapid connection of switch microcontroller 108 to switch hardware 106. The incoming data volume is limited by the instantaneously maximum transmission speed of 100 Mbit/s in the automotive Ethernet. Moreover, switch hardware 106 can prefilter the data traffic to switch microcontroller 108 and, thereby, regulate the data volume in switch microcontroller 108. Due to the architectural advantage of switch system on a chip 104 and the limitations of the automotive Ethernet, it is possible to analyze a sufficient quantity of Ethernet packets and to implement an extensive NIDS or NIDPS on switch microcontroller 108 of switch system on a chip 104. Due to the placement of the NIDS or the NIDPS in switch microcontroller 108 of switch system on a chip 104, it is possible, due to the central position of the control unit, i.e., of the gateway or of the domain control unit in the network topology, to analyze the network data traffic of the communication network or of the entire subsystem.

A method for detecting anomalies in data in the data traffic across a communication network in a vehicle begins, for example, when a data packet reaches the associated automotive Ethernet control unit, is described in the following with reference to FIG. 2. Host controller 116 or the domain controller communicates, for example, via interface 118 with coupling element 104, in order to centrally administer subsystem 310 as a local security area of communication network 300.

After the start, a step 202 is carried out. In step 202, a data packet is received at one of a plurality of hardware interfaces 102. The data packet or a copy of the data packet is stored, for example, in message buffer 114 of distribution unit 106.

Thereafter, an optional step 204 is carried out. In optional step 204, filter element 112 affects the data traffic across internal interface 110 to computing unit 108, in order to regulate a data volume for the detection of anomalies in computing unit 108.

Thereafter, a step 206 is carried out. In step 206, the data packet or the copy of the data packet is provided by distribution unit 106 to computing unit 108 via internal interface 110 for the detection of anomalies.

Thereafter, a step 208 is carried out. In step 208, the data packet or the copy of the data packet is analyzed using coupling element 104 for a detection of anomalies in the data of the communication network or of the subsystem of the communication network connected to one of hardware interfaces 102.

Thereafter, a step 210 is carried out. In step 210, one of hardware interfaces 102 to the communication network is established by computing unit 108 of coupling element 104 for the transmission of the data.

Thereafter, a step 212 is carried out. In step 212, data arriving in the data packet are transmitted by coupling element 104 via the at least one of hardware interfaces 102. In one aspect, the data are transmitted from distribution unit 106 via established hardware interfaces 102.

Thereafter, step 202 is carried out for further incoming data packets.

In an example embodiment, a computer program is configured for carrying out the described method or parts of the method when the computer program is run on a computer. The computer program is stored, for example, on a machine-readable memory medium.

In addition to the detection of anomalies by analyzing and monitoring the network traffic, the positioning of the NIDS or the NIDPS on the switch system on a chip also makes it possible to implement prevention measures. For this purpose, instead of a copy, the actual Ethernet data traffic itself is directed by the microcontroller of the switch system on a chip. An incoming data packet is transferred by the switch hardware to the microcontroller and is investigated by the NIDS or the NIDPS. If the NIDS or the NIDPS establishes that there is no anomaly, the data packet is returned, unchanged, by the microcontroller to the switch hardware and the data packet goes on its intended path in the network. If the NIDS or the NIDPS establishes that there is an anomaly, for example, the data packet can be changed before it is returned to the switch hardware, or it can be discarded.

FIG. 3 schematically shows parts of an automotive Ethernet communication network 300, in which automotive Ethernet control unit 100, which encompasses the NIDS or the NIDPS, is designed as a central gateway 100. Automotive Ethernet communication network 300 encompasses, as represented in FIG. 3, central gateway 100, a domain control unit 302, and multiple control units 304 having specific tasks. In the example, four various specific control units 304 are connected via their particular port 306 to central gateway 100, at four of the ports 102. Domain control unit 302 is connected via one of its ports 308 to a fifth one of the ports 102 of central gateway 100. Domain control unit 302 administers a subsystem 310 formed of specific control units 304 having a shared higher-level task. In the example, in subsystem 310, five further specific control units 304 are connected, via their ports 306, to domain control unit 302 via five further ports 312 of domain control unit 302. In subsystem 310 of domain control unit 302, either an automotive Ethernet or another automotive-typical bus system is utilized, for example, a controller area network or a FlexRay system.

In the example, the NIDS or the NIDPS is placed in central gateway 100. The NIDS or the NIDPS can also be placed in domain control unit 302, provided the automotive Ethernet is utilized in subsystem 310 of the domain control unit.

In general, communication network 300 for a vehicle encompasses a gateway, at least one domain control unit connected to the gateway for communication, and at least one control unit connected to the domain control unit for communication. The domain control unit or the gateway is designed for detecting anomalies in data in the data traffic in communication network 300 or in subsystem 310 of communication network 300. The above-described method is utilized for this purpose.

The switch system on a chip can be designed as an ASIC or an FPGA. Preferably, the switch system on a chip is situated on a piece of silicon or another semiconductor substrate as an integrated circuit.

What is claimed is:

1. A device comprising:
a plurality of hardware interfaces configured to interface with a communication network in a vehicle; and
a monolithic coupling element, wherein the monolithic coupling element is configured to:
receive data in data packets from one of the hardware interfaces;
transmit the data in the data packets via at least one of the hardware interfaces; and
analyze a selected subset of the received data packets or copies of the data packets and thereby detect an anomaly in data of data traffic of the communication network of the vehicle or of a subsystem of the communication network connected to one of the hardware interfaces;
wherein the monolithic coupling element includes a distributor, a computer, and an internal interface located between the computer and the distributor, the distributor is configured to provide the selected subset of the data packets or copies of the data packets to the computer via the internal interface for the detection of the anomaly, the distributor including a filter that is configured to select the subset of the received data packets in order to regulate a data volume for the anomaly detection in the computer.

2. The device of claim 1, wherein:
the internal interface is independent of the plurality of hardware interfaces; and
the computer is configured to establish the at least one of the hardware interfaces via the internal interface, across which the distribution unit transmits the data.

3. The device of claim 2, wherein the distributor, the computer, and the internal interface are designed as a one-chip system.

4. The device of claim 1, wherein the distributor includes a message buffer configured to store the data packet or copy of the data packet.

5. The device of claim 1, further comprising a host controller or domain controller that is connected to the monolithic coupling element via an interface and that is configured to centrally administer the subsystem as a local security area of the communication network.

6. A communication network for a vehicle, the communication network comprising:
a gateway;
at least one domain controller communicatively connected to the gateway; and
at least one controller connected to the at least one domain controller for communication;
wherein:
the at least one domain controller or the gateway includes:
a plurality of hardware interfaces to the communication network; and
a monolithic coupling element; and
the monolithic coupling element is configured to:
receive data in data packets from one of the hardware interfaces;
transmit the data in the data packets via at least one of the hardware interfaces; and
analyze a selected subset of the received data packets or copies of the data packets and thereby detect an anomaly in data of data traffic of a communication network of a vehicle or of a subsystem of the communication network connected to one of the hardware interfaces, the communication network or subsystem including the at least one domain controller and the at least one controller;
wherein the monolithic coupling element includes a distributor, a computer, and an internal interface located between the computer and the distributor, the distributor is configured to provide the selected subset of the data packets or copies of the data packets to the computer via the internal interface for the detection of the anomaly, the distributor including a filter that is configured to select the subset of the received data packets in order to regulate a data volume for the anomaly detection in the computer.

7. A method for detecting an anomaly in data of data traffic across a communication network in a vehicle, the method comprising:
a monolithic coupling element:
receiving data in data packets from one of a plurality of hardware interfaces to the communication network in the vehicle;
transmitting the data in the data packets via at least one of the hardware interfaces; and
analyzing a selected subset of the data packets or copies of the data packets and thereby detect the anomaly in data of the communication network or of a subsystem of the communication network connected to one of the hardware interfaces;
wherein the monolithic coupling element includes a distributor, a computer, and an internal interface located between the computer and the distributor, the distributor providing the selected subset of the data packets or copies of the data packets to the computer via the internal interface for the detection of the anomaly, the distributor including a filter that selects the subset of the received data packets in order to regulate a data volume for the anomaly detection in the computer.

8. The method of claim 7, further comprising:
the computer of the monolithic coupling element establishing, via the internal interface, which is independent of the hardware interfaces to the communication network, the at least one of the hardware interfaces via which the distributor transmits the data in the transmitting step.

9. The method of claim 8, further comprising storing the data packet or copy of the data packet in a message buffer of the distributor.

10. The method of claim 7, further comprising a host controller or a domain controller communicating via an interface with the monolithic coupling element, in order to centrally administer the subsystem as a local security area of the communication network.

11. A non-transitory computer-readable medium on which are stored instructions that ae executable by a processor of a monolithic coupling element and that, when executed by the processor, cause the processor to perform a method for detecting an anomaly in data of data traffic across a communication network in a vehicle, the method comprising:

the monolithic coupling element:
- receiving data in data packets from one of a plurality of hardware interfaces to the communication network in the vehicle;
- transmitting the data in the data packets via at least one of the hardware interfaces; and
- analyzing a selected subset of the data packets or copies of the data packets and thereby detect the anomaly in data of the communication network or of a subsystem of the communication network connected to one of the hardware interfaces;
- wherein the monolithic coupling element includes a distributor, a computer, and an internal interface located between the computer and the distributor, the distributor providing the selected subset of the data packets or copies of the data packets to the computer via the internal interface for the detection of the anomaly, the distributor including a filter that selects the subset of the received data packets in order to regulate a data volume for the anomaly detection in the computer.

* * * * *